United States Patent [19]

Tennent et al.

[11] Patent Number: 5,691,054
[45] Date of Patent: Nov. 25, 1997

[54] THREE DIMENSIONAL MACROSCOPIC ASSEMBLAGES OF RANDOMLY ORIENTED CARBON FIBRILS AND COMPOSITES CONTAINING SAME

[75] Inventors: Howard Tennent, Kennett Square, Pa.; Robert W. Hausslein, Lexington, Mass.; Nicholas Leventis, Somerville, Mass.; David Moy, Winchester, Mass.

[73] Assignee: Hyperion Catalysis Int'l., Inc., Cambridge, Mass.

[21] Appl. No.: 428,496

[22] Filed: Apr. 27, 1995

Related U.S. Application Data

[63] Continuation of Ser. No. 57,328, May 5, 1993, abandoned.
[51] Int. Cl.⁶ ........................................ D02G 3/00
[52] U.S. Cl. .................. 428/359; 428/367; 428/342; 428/402; 428/408; 423/447.1; 423/447.2; 210/500.1; 210/510.1
[58] Field of Search ........................... 428/359, 360, 428/367, 408, 372; 210/500.1, 500.25, 500.11, 503, 505, 500.43; 423/447.1, 447.2

[56] References Cited

U.S. PATENT DOCUMENTS

| | | | |
|---|---|---|---|
| 4,663,230 | 5/1987 | Tennent | 428/367 |
| 5,165,909 | 11/1992 | Tennent et al. | 428/367 |
| 5,238,568 | 8/1993 | Fely et al. | 210/505 |

FOREIGN PATENT DOCUMENTS

| | | | |
|---|---|---|---|
| WO03455 | 6/1986 | WIPO | 428/367 |
| WO07163 | 8/1989 | WIPO | 428/367 |
| WO07023 | 6/1990 | WIPO | 428/367 |
| WO05089 | 4/1991 | WIPO | 428/367 |

*Primary Examiner*—Patrick Ryan
*Assistant Examiner*—J. M. Gray
*Attorney, Agent, or Firm*—Curtis, Morris & Safford, P.C.

[57] ABSTRACT

It has now been found that highly advantageous three-dimensional, macroscopic assemblages of randomly oriented carbon fibrils can be prepared which have relatively uniform physical properties along one, preferably two and most desirably three-dimensional axis of the three-dimensional assemblage. Preferred compositions prepared according to the methods of the invention have uniform physical properties along at least one dimensional axis and have relatively isotropic physical properties in at least one plane of the assemblage and most desirably are isotropic throughout the entire three-dimensional structure.

33 Claims, 1 Drawing Sheet

THREE DIMENSIONAL MACROSCOPIC ASSEMBLAGES OF RANDOMLY ORIENTED CARBON FIBRILS AND COMPOSITES CONTAINING SAME

This application is a continuation of application Ser. No. 08/057,328, filed May 5, 1993, now abandoned.

FIELD OF THE INVENTION

The invention relates generally to assemblages of carbon fibrils. More specifically, the invention relates to three dimensional, macroscopic, assemblages of randomly oriented carbon fibrils having a bulk density of from 0.001 to 0.50 gm/cc and to methods for preparing such assemblages. Even more specifically, the invention relates to such assemblages for use as catalyst supports, electrodes, chromatographic media, etc. and to composite structures comprising the assemblage and a second material contained within the assemblage.

BACKGROUND OF THE INVENTION

Carbon fibrils are vermicular carbon deposits having diameters less than 500 nanometers. They exist in a variety of forms, and have been prepared through the catalytic decomposition of various carbon-containing gases at metal surfaces.

Tennent, U.S. Pat. No. 4,663,230, describes carbon fibrils that are free of a continuous thermal carbon overcoat and have multiple graphitic outer layers that are substantially parallel to the fibril axis. As such they may be characterized as having their c-axes, the axes which are perpendicular to the tangents of the curved layers of graphite, substantially perpendicular to their cylindrical axes. They generally have diameters no greater than 0.1 micron and length to diameter ratios of at least 5. Desirably they are substantially free of a continuous thermal carbon overcoat, i.e., pyrolytically deposited carbon resulting from thermal cracking of the gas feed used to prepare them.

Tubular fibrils having graphitic layers that are substantially parallel to the microfiber axis and diameters between 3.5 and 75 nanometers, are described in Tennent et al., U.S. Ser. No. 871,676 filed Jun. 6, 1986, refiled as continuation application Ser. No. 593,319 filed Oct. 1, 1990, now U.S. Pat. No. 5,165,909, issued Nov. 24, 1992 ("Novel Carbon Fibrils, Method for Producing Same and Compositions Containing Same"), Tennent et al., U.S. Ser. No. 871,675 filed Jun. 6, 1986, refiled as continuation application Ser. No. 492,365 filed Mar. 9, 1990, now U.S. Pat. No. 5,171,560, issued Dec. 15, 1992 ("Novel Carbon Fibrils, Method for Producing Same and Encapsulated Catalyst"), Snyder et al., U.S. Ser. No. 149,573 filed Jan. 28, 1988, refiled as continuation application Ser. No. 494,894, filed Mar. 13, 1990, refiled as continuation application Ser. No. 694,244, filed May 1, 1991 ("Carbon Fibrils"), Mandeville et al., U.S. Ser. No. 285,817 filed Dec. 16, 1988, refiled as continuation application Ser. No. 746,065, filed Aug. 12, 1991, refiled as continuation application Ser. No. 08/284,855, filed Aug. 2, 1994 ("Fibrils"), and McCarthy et al., U.S. Ser. No. 351,967 filed May 15, 1989, refiled as continuation application Ser. No. 823,021, refiled as continuation application Ser. No. 117,873, refiled as continuation application Ser. No. 08/329,774, filed Oct. 27, 1994 ("Surface Treatment of Carbon Microfibers"), all of which are assigned to the same assignee as the present application and are hereby incorporated by reference. One aspect of substantial parallelism is that the projection of the graphite layers on the microfiber axis extends for a relatively long distance in terms of the external diameter of the microfiber, preferably at least two microfiber diameters, more preferably at least five diameters, as described in Snyder et al., U.S. Ser. No. 149,573.

Fibrils are useful in a variety of applications. For example, they can be used as reinforcements in fiber-reinforced composite structures or hybrid composite structures (i.e. composites containing reinforcements such as continuous fibers in addition to fibrils). The composites may further contain fillers such as a carbon black and silica, alone or in combination with each other. Examples of reinforceable matrix materials include inorganic and organic polymers, ceramics (e.g., lead or copper). When the matrix is an organic polymer, it may be a thermoset resin such as epoxy, bismaleimide, polyamide, or polyester resin; a thermoplastic resin; or a reaction injection molded resin.

OBJECTS OF THE INVENTION

It is an object of the invention to provide a composition of matter which comprises carbon fibrils and more specifically an assemblage of randomly oriented carbon fibrils which has a low bulk density and which can be used as a substrate or medium for various industrial and scientific purposes.

It is another object of the invention to provide a composition of matter comprising a three-dimensional, macroscopic assemblage of a multiplicity of randomly oriented carbon fibrils having a low bulk density to which can be added one or more functional second materials in the nature of active catalysts, electroactive species, etc. so as to form composites having novel industrial properties.

It is yet another object of the invention to provide three-dimensional, macroscopic assemblages of a multiplicity of randomly oriented carbon fibrils which have isotropic physical properties so that such compositions can be used reliably and interchangeably for multiple industrial purposes.

It is a further object of the invention to provide processes for the preparation of such three-dimensional microscopic assemblages of carbon fibrils which are efficient and convenient to use in the preparation of low-density compositions.

It is a still further object of the invention to provide improved catalyst supports, filter media, chromatographic media, EMI shielding and other compositions of industrial value based on three-dimensional assemblages of carbon fibrils.

SUMMARY OF THE INVENTION

Definitions

The term "assemblage" refers to any configuration of a mass of individual fibrils and embraces intertwined as well as discrete fibril embodiments.

The term "macroscopic" means that the assemblages may be of any suitable size to achieve an industrial or scientific purpose.

The term "physical property" means an inherent, measurable property of the assemblage, e.g. resistivity.

The term "isotropic" means that all measurements of a physical property within a plane or volume of the assemblage, independent of the direction of the measurement, are of a constant value. It is understood that measurements of such non-solid compositions must be taken on a representative sample of the assemblage so that the average value of the void spaces is taken into account.

3

The term "relatively" means that ninety-five percent of the values of the physical property when measured along an axis of, or within a plane of or within a volume of the assemblage, as the case may be, will be within plus or minus fifty percent of a mean value.

The term "substantially" means that ninety-five percent of the values of the physical property when measured along an axis of, or within a plane of or within a volume of the assemblage, as the case may be, will be within plus or minus ten percent of a mean value.

The terms "relatively isotropic" and "substantially isotropic" correspond to the ranges of variability in the values of a physical property set forth above.

The Invention

The invention is broadly in a composition of matter consisting essentially of a three-dimensional, macroscopic assemblage of a multiplicity of randomly oriented carbon fibrils, said fibrils being substantially cylindrical with a substantially constant diameter, having c-axes substantially perpendicular to their cylindrical axis, being substantially free of pyrolytically deposited carbon and having a diameter between about 3.5 and 70 nanometers, said assemblage having a bulk density of from 0.001 to 0.50 gm/cc.

The assemblages described above can be used to great advantage as three-dimensional matrixes for a number of industrial purposes. For example, the assemblages can be used as filter media, as catalyst supports, as electroactive materials for use, e.g. in electrodes in fuel cells and batteries, and as chromatography media. It has been found that the assemblages are useful in the formation of composites which comprise the assemblage together with either a particulate solid, an electroactive component or a catalytically active metal or metal-containing compound, as well as in composites with polymers.

It has now been found that highly advantageous three-dimensional, macroscopic assemblages of randomly oriented carbon fibrils can be prepared which have relatively uniform physical properties along one, preferably two and most desirably three-dimensional axis of the three-dimensional assemblage. Preferred compositions prepared according to the methods of the invention have uniform physical properties along at least one dimensional axis and have relatively isotropic physical properties in at least one plane of the assemblage and most desirably are isotropic throughout the entire three-dimensional structure.

These advantageous compositions can be prepared by dispersing fibrils in aqueous or organic solid media and then filtering the fibrils. Low density compositions are advantageously prepared by forming a gel or paste of carbon fibrils in a fluid, e.g. an organic solvent such as propane and then heating that gel or paste to above the critical temperature of the medium, removing supercritical fluid and finally removing a low-density porous mat or plug from the vessel in which the process has been carried out.

DETAILED DESCRIPTION

In the Drawings

Figure 1:
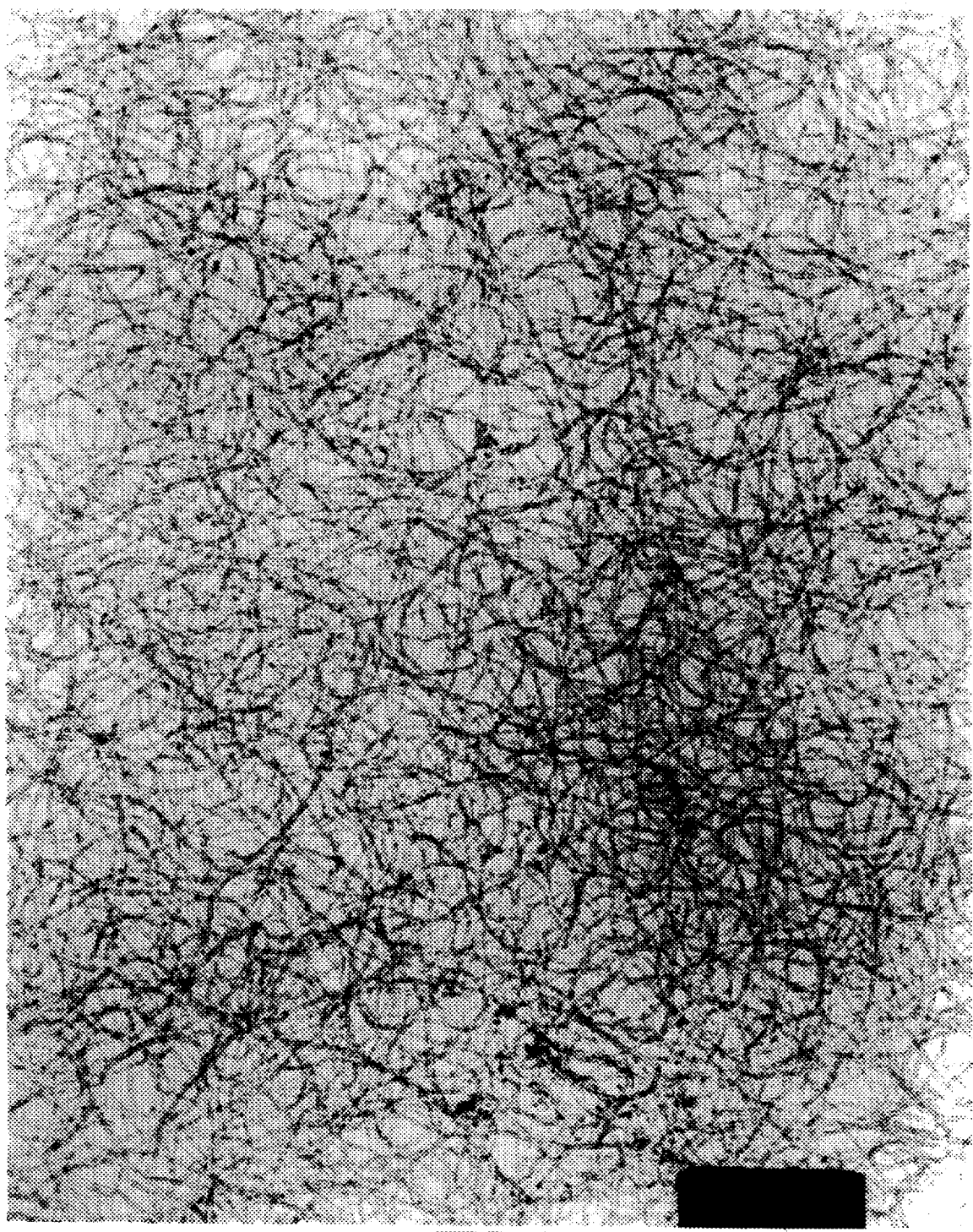

FIG. 1 is a photomicrograph of a three dimensional assemblage of randomly oriented carbon fibrils prepared by the method of Example 1.

Production of Carbon Fibrils

Fibrils are prepared by contacting a carbon-containing gas with a metal catalyst in a reactor for an appropriate period of time, at a suitable pressure, and at a temperature sufficient to produce fibrils with the above-described morphology. Reaction temperatures are generally 400°–850° C., more preferably 600°–750° C. Fibrils are advantageously prepared continuously by bringing the reactor to the reaction temperature, adding metal catalyst particles, and then continuously contacting the catalyst with a carbon-containing gas.

Examples of suitable feed gases, catalysts and reaction conditions are given in the several patent applications referenced above as well as in Moy et al., U.S. patent applications Ser. Nos. 887,307, filed May 22, 1992, refiled as continuation application 08/284,742, filed Aug. 2, 1994, refiled as continuation application 08/469,430, filed Jun. 6, 1995 and 887,314 filed May 22, 1992, refiled as continuation application Ser. No. 07/320,564, filed Oct. 11, 1994, which are hereby incorporated by reference.

Fibrils may be prepared such that at least a portion of the fibrils are in the form of aggregates. As used herein, an aggregate is defined as two or more entangled fibrils. Fibril aggregates typically have macroscopic morphologies, as determined by scanning electron microscopy, in which they are randomly entangled with each other to form entangled balls of fibrils resembling a bird's nest ("BN"); or as aggregates consisting of bundles of straight to slightly bent or kinked carbon fibrils having substantially the same relative orientation, and having the appearance of combed yarn ("CY") e.g., the longitudinal axis of each fibril, despite individual bends or kinks, extends in the same direction as that of the surrounding fibrils in the bundles; or, as aggregates consisting of straight to slightly bent or kinked fibrils which are loosely entangled with each other to form an "open net" ("ON") structure. In open net structures the degree of fibril entanglement is greater than observed in the combed yarn aggregates (in which the individual fibrils have substantially the same relative orientation) but less than that of bird's nest.

In addition to fibrils such as are described in Tennent, U.S. Pat. No. 4,663,230, fibrils may be prepared having different macromorphologies, such as the so-called fishbone ("FB") morphology described in published European Patent Application No. 198,558 to J. W. Geus (published Oct. 22, 1986). Fibrils of the so-called fishbone morphology may be characterized as having their c-axes (as defined above) at some angle less than perpendicular to the cylindrical axes of the fibrils. The invention relates to such fishbone fibrils as well as to those described in Tennent, U.S. Pat. No. 4,663,230.

Carbon Fibrils

The carbon fibrils preferably comprise a combination of discrete fibrils and fibril aggregates. However, the fibrils may all be in the form of aggregates. The aggregates, when present, are generally of the bird's nest, combed yarn or open net morphologies. The more "entangled" the aggregates are, the more processing will be required to achieve a suitable composition. This means that the selection of combed yarn or open net aggregates is most preferable for the majority of applications. However, bird's nest aggregates will generally suffice.

The Assemblages

Broadly, the invention is in a composition of matter consisting essentially of a three-dimensional, macroscopic assemblage of a multiplicity of randomly oriented carbon fibrils, said fibrils being substantially cylindrical with a substantially constant diameter, having c-axes substantially perpendicular to their cylindrical axis, being substantially free of pyrolytically deposited carbon and having a diameter between about 3.5 and 70 nanometers, said assemblage having a bulk density of from 0.001 to 0.50 gm/cc. Preferably the assemblage has relatively or substantially uniform physical properties along at least one dimensional axis and desirably have relatively or substantially uniform physical properties in one or more planes within the assemblage, i.e. they have isotropic physical properties in that plane. In other embodiments, the entire assemblage is relatively or substantially isotropic with respect to one or more of its physical properties.

The physical properties which can be easily measured and by which uniformity or isotrophy are determined include resistivity and optical density.

Composites Containing the Assemblages

Broadly, the fibril assemblages may be used for any purpose for which porous media are known to be useful. These include filtration, electrodes, catalyst supports, chromatography media, etc. In addition, the assemblages are a convenient bulk form of carbon fibrils and may thus be used for any known applications including especially EMI shielding, polymer composites, active electrodes, etc.

For some applications like EMI shielding, filtration and current collection, unmodified fibril assemblages can be used. For other applications, the fibril assemblages are a component of a more complex material, i.e. they are part of a composite. Examples of such composites are polymer molding compounds, chromatography media, electrodes for fuel cells and batteries, fibril supported catalyst and ceramic composites, including bioceramics like artificial bone.

In some of these composites, like molding compound and artificial bone, it is desirable that the non-fibril components fill—or substantially fill—the porosity of the fibril assemblage. For others, like electrodes, catalysts, and chromatography media, their usefulness depends on the composite retaining at least some of the porosity of the fibril assemblage.

Methods of Preparing Fibril Assemblages

While fibrils of any morphology may be used to prepare the assemblages of the invention by using the methods of the invention, it is preferred to use fibrils having a parallel type morphology such as CC, DD or CY. Methods for the preparation of fibrils having these morphologies are described in Moy et al., U.S. patent application Ser. Nos. 887,307 and 887,314 filed May 22, 1992.

Mats with a thickness between 0.02 and 0.50 millimeters have a density of typically 0.20 g/cc corresponding to a pore volume fraction of 0.90. Their electrical resistivity in the plane of the mat is typically 0.02 ohm/cm; resistivity perpendicular to the mat is typically 1.0 ohm/cm.

Solid ingredients can be incorporated within the fibril mat by mixing them with the fibril dispersion prior to mat formation. The content of other solids in the dry mat may be made as high as fifty parts solids per part of fibrils.

Fibrils from the synthesis reactor are dispersed at high shear in a high-shear mixer, e.g. a Waring Blender. The dispersion may contain broadly from 0.01 to 10% fibrils in water, ethanol, mineral spirits, etc.. This procedure adequately opens fibril bundles, i.e. tightly wound bundles, of fibrils and disperses fibrils to form self-supporting mats after filtration and drying. The application of high shear mixing may take up to several hours. Mats prepared by this method are not free of aggregates.

If the high shear procedure is followed by ultrasonication, dispersion is improved. Dilution to 0.1% or less aids ultrasonication. Thus, 200 cc of 0.1% fibrils may be sonified by a Bronson Sonifier Probe (450 watt power supply) for 5 minutes or more to further improve the dispersion.

To achieve the highest degrees of dispersion, i.e. a dispersion which is free or virtually free of fibril aggregates, sonication must take place either at very low concentration in a compatible liquid, e.g. at 0.001% to 0.01% concentration in ethanol or at higher concentration e.g. 0.1% in water to which a surfactant, e.g. TRITON X-100® has been added in a concentration of about 0.5%. The mat which is subsequently formed may be rinsed free or substantially free of surfactant by sequential additions of water followed by vacuum filtration. The three-dimensional, macroscopic assemblage may be a composite comprising a particulate material selected from aluminum oxide, silicon dioxide or silicon carbide. The composite may also contain and electroactive component selected from lead, lead compounds, manganese or a manganese compound.

Particulate solids such as $MnO_2$ (for batteries) and $Al_2O_3$ (for high temperature gaskets) may be added to the fibril dispersion prior to mat formation at up to 50 parts added solids per part of fibrils.

Reinforcing webs and scrims may be incorporated on or in the mats during formation. Examples are polypropylene mesh and expanded nickel screen.

Methods of Improving the Stability of Assemblages

In order to increase the stability of the fibril assemblages, it is possible to deposit polymer at the intersections of the assemblage. This may be infiltrating the assemblage with a dilute solution of polymer cement and allowing the solvent to evaporate. Capillary forces will concentrate the polymer at fibril intersections. It is understood that in order to substantially improve the stiffness and integrity of the assemblage, only a small fraction of the fibril intersections need be cemented.

EXAMPLES

The invention is further described in the following examples.

Example I

Preparation of a Porous Fibril Mat

A dilute dispersion of fibrils is used to prepare porous mats or sheets. A suspension of fibrils is prepared containing 0.5% fibrils in water using a Waring Blender. After subsequent dilution to 0.1%, the fibrils are further dispersed with a probe type sonifier. The dispersion is then vacuum filtered to form a mat, which is then oven dried.

The mat has a thickness of about 0.20 mm and a density of about 0.20 gm/cc corresponding to a pore volume of 0.90. The electrical resistivity in the plane of the mat is about 0.02 ohm/cm. The resistivity in the direction perpendicular to the mat is about 1.0 ohm/cm.

Example II

Preparation of a Porous Fibril Mat

A suspension of fibrils is prepared containing 0.5% fibrils in ethanol using a Waring Blendor. After subsequent dilution to 0.1%, the fibrils are further dispersed with a probe type sonifier. The ethanol is then allowed to evaporate and a mat is formed. The mat has the same physical properties and characteristics as the mat prepared in Example I.

Example III

Preparation of a Low-Density Porous Fibril Plug

Supercritical fluid removal from a well dispersed-fibril paste is used to prepare low density shapes. 50 cc of a 0.5% dispersion in n-pentane is charged to a pressure vessel of slightly larger capacity which is equipped with a needle valve to enable slow release of pressure. After the vessel is heated above the critical temperature of pentane (Tc= 196.6°), the needle valve is cracked open slightly to bleed the supercritical pentane over a period of about an hour.

The resultant solid plug of Fibrils, which has the shape of the vessel interior, has a density of 0.005 g/cc, corresponding to a pore volume fraction of 0.997%. The resistivity is isotropic and about 20 ohm/cm.

Example IV

Preparation of EMI Shielding

A fibril paper is prepared according to the procedures of Example I. Table I below sets forth the attenuation achieved at several paper thickness.

TABLE I

FIBRIL PAPER
EMI SHIELDING
ATTENUATION 30 MHZ TO 1 GHz

| THICKNESS, INCHES (MM) | WEIGHT | ATTENUATION |
|---|---|---|
| 0.002 (0.5) | 12 G/M$^2$ | 27 Db |
| 0.005 (.125) | 30 | 37 Db |
| 0.017 (.425) | 120 | 48 Db |

Example V

A fibril mat prepared by the method of Example I is used as an electrode in an electrochemiluminescence cell such as is described in PCT U.S. 85/02153 (WO 86/02734) and U.S. Pat. Nos. 5,147,806 and 5,068,088. When the voltage is pulsed in the presence of ruthenium trisbipyridyl, electrochemiluminescence is observed.

What is claimed is:

1. A composition of matter consisting essentially of a three-dimensional, macroscopic assemblage of a multiplicity of randomly oriented carbon fibrils, said fibrils being substantially cylindrical with a substantially constant diameter, being substantially free of pyrolytically deposited carbon and having a diameter ranging from about 3.5 and 70 nanometers, said assemblage having a bulk density of from 0,001 to 0.50 gm/cc and at least two dimensions greater than about 0.02 mm.

2. A composition of matter as recited in claim 1, wherein said assemblage has at least two dimensions greater than about 0.2 mm.

3. A composition of matter as recited in claim 1, wherein said fibrils comprise graphitic layers and the projection of the graphitic layers along the fibril axis extends at least two fibril diameters.

4. A composite material comprising:

(a) a three-dimensional, macroscopic assemblage of a multiplicity of randomly oriented carbon fibrils, said fibrils being substantially cylindrical with a substantially constant diameter, being substantially free of pyrolytically deposited carbon and having a diameter ranging from about 3.5 and 70 nanometers, said assemblage having a bulk density of from 0,001 to 0.50 gm/cc and at least two dimensions greater than about 0.02 mm; and (b) a second component incorporated within said assemblage comprising (i) particulate solids, or (ii) an electroactive material; or (iii) a catalytically active metal or metal-containing compound, in an amount up to fifty parts per part by weight of fibrils.

5. A composite material as recited in claim 4 wherein said electroactive component is lead or a lead compound or manganese or a manganese compound.

6. A composite material as recited in claim 4 wherein said particulate material is an aluminum oxide, silicon dioxide or silicon carbide.

7. A composite material as recited in claim 4 wherein said particulate material is a catalyst.

8. A composite material as recited in claim 4, wherein said assemblage has at least two dimensions greater than about 0.2 mm.

9. A composite material as recited in claim 4, wherein said fibril comprises graphitic layers and the projection of the graphitic layers along the fibril axis extends at least two fibril diameters.

10. A three-dimensional, macroscopic assemblage of a multiplicity of randomly oriented carbon fibrils, said fibrils being substantially cylindrical with a substantially constant diameter, being substantially free of pyrolytically deposited carbon and having a diameter ranging from about 3.5 and 70 nanometers, said assemblage having relatively uniform physical properties along at least one dimensional axis thereof and a bulk density of from 0.001 to 0.50 gm/cc and at least two dimensions greater than about 0.02 mm.

11. A three-dimensional assemblage as recited in claim 10 having substantially uniform physical properties along said one dimensional axis.

12. A composite material comprising (a) an assemblage of fibrils as recited in claim 10, and (b) a second material at least partially contained within said assemblage.

13. A three-dimensional, macroscopic assemblage as recited in claim 10, wherein said assemblage has at least two dimensions greater than about 0.2 mm.

14. A three-dimensional, macroscopic assemblage as recited in claim 10, wherein said fibrils comprise graphitic layers and the projection of the graphitic layers along the fibril axis extends at least two fibril diameters.

15. A three-dimensional, macroscopic assemblage of a multiplicity of randomly oriented carbon fibrils, said fibrils being substantially cylindrical with a substantially constant diameter, being substantially free of pyrolytically deposited carbon and having a diameter between about 3.5 and 70 nanometers, said assemblage having relatively isotropic physical properties in at least one plane thereof and a bulk density of from 0.001 to 0.50 gm/cc and at least two dimensions greater than about 0.02 mm.

16. A three-dimensional assemblage as recited in claim 15 having substantially isotropic physical properties in said plane.

17. A composite material comprising (a) an assemblage of fibrils as recited in claim 15 and (b) a second material at least partially contained within said assemblage.

18. A three-dimensional, macroscopic assemblage as recited in claim 15, wherein said assemblage has at least two dimensions greater than about 0.2 mm.

19. A three-dimensional, macroscopic assemblage as recited in claim 15, wherein said fibrils comprise graphitic layers and the projection of the graphitic layers along the fibril axis extends at least two fibril diameters.

20. A three-dimensional, macroscopic assemblage of a multiplicity of randomly oriented carbon fibrils, said fibrils being substantially cylindrical with a substantially constant diameter, being substantially free of pyrolytically deposited carbon and having a diameter ranging from about 3.5 and 70 nanometers, said assemblage having relatively isotropic physical properties and a bulk density of from 0.001 to 0.50 gm/cc and at least two dimensions greater than about 0.02 mm.

21. A three-dimensional assemblage as recited in claim 20 having substantially isotropic physical properties.

22. A composite material comprising (a) an assemblage of fibrils as recited in claim 20, and (b) a second material at least partially contained within said assemblage.

23. A three-dimensional assemblage as recited in claim 20, wherein said assemblage has at least two dimensions greater than about 0.2 mm.

24. A three-dimensional, macroscopic assemblage as recited in claim 20, wherein said fibrils comprise graphitic layers and the projection of the graphitic layers along the fibril axis extends at least two fibril diameters.

25. A composite material comprising:
(a) a three-dimensional, macroscopic assemblage of a multiplicity of randomly oriented carbon fibrils, said fibrils being substantially cylindrical with a substantially constant diameter, having a c-axes substantially perpendicular to their cylindrical axis, being substantially free of pyrolytically deposited carbon and having a diameter ranging from about 3.5 and 70 nanometers, said assemblage having a bulk density of from 0.001 to 0.50 gm/cc and at least two dimensions greater than about 0.02 mm; and
(b) a second component incorporated within said assemblage comprising (i) particulate solids, or (ii) an electroactive material; or (iii) a catalytically active metal or metal-containing compound, in an amount up to fifty parts per part by weight of fibrils.

26. A composite material as recited in claim 25, wherein said assemblage has at least two dimensions greater than about 0.2 mm.

27. A composite material as recited in claim 25, wherein said fibrils comprise graphitic layers and the projection of the graphitic layers along the fibril axis extends at least two fibril diameters.

28. A three-dimensional, macroscopic assemblage of a multiplicity of randomly oriented carbon fibrils, said fibrils being substantially cylindrical with a substantially constant diameter, having c-axes less than substantially perpendicular to their cylindrical axis, being substantially free of pyrolytically deposited carbon and having a diameter ranging from about 3.5 and 70 nanometers, said assemblage having relatively uniform physical properties along at least one dimensional axis thereof and a bulk density of from 0.001 to 0.50 gm/cc and at least two dimensions greater than about 0.02 mm.

29. A three-dimensional, macroscopic assemblage as recited in claim 28, wherein said assemblage has at least two dimensions greater than about 0.2 mm.

30. A three-dimensional, macroscopic assemblage as recited in claim 28, wherein said fibrils comprise graphitic layers and the projection of the graphitic layers along the fibril axis extends at least two fibril diameters.

31. A three-dimensional, macroscopic assemblage of a multiplicity of randomly oriented carbon fibrils, said fibrils being substantially cylindrical with a substantially constant diameter, having c-axes less than substantially perpendicular to their cylindrical axis, being substantially free of pyrolytically deposited carbon and having a diameter ranging from about 3.5 and 70 nanometers, said assemblage having relatively isotropic physical properties and a bulk density of from 0.001 to 0.50 gm/cc and at least two dimensions greater than about 0.02 mm.

32. A three-dimensional, macroscopic assemblage as dimensions recited in claim 31, wherein said assemblage has at least two greater than about 0.2 mm.

33. A three-dimensional, macroscopic assemblage as recited in claim 31, wherein said fibrils comprise graphitic layers and the projection of the graphitic layers along the fibril axis extends at least two fibril diameters.

* * * * *